Jan. 1, 1952 R. E. GRAHAM 2,580,673

SAW-TOOTH GENERATOR AND SYSTEM UTILIZING IT

Filed Nov. 14, 1947 5 Sheets-Sheet 1

INVENTOR
R. E. GRAHAM
BY Hugh S. Wertz
ATTORNEY

SAW-TOOTH GENERATOR AND SYSTEM UTILIZING IT

Filed Nov. 14, 1947 5 Sheets-Sheet 2

INVENTOR
R. E. GRAHAM
BY Hugh S. Wertz
ATTORNEY

SAW-TOOTH GENERATOR AND SYSTEM UTILIZING IT

Filed Nov. 14, 1947 5 Sheets-Sheet 3

INVENTOR
R. E. GRAHAM
BY Hugh S. Wertz
ATTORNEY

SAW-TOOTH GENERATOR AND SYSTEM UTILIZING IT

Filed Nov. 14, 1947 5 Sheets-Sheet 4

INVENTOR
R. E. GRAHAM
BY Hugh S. Wertz
ATTORNEY

Jan. 1, 1952 R. E. GRAHAM 2,580,673

SAW-TOOTH GENERATOR AND SYSTEM UTILIZING IT

Filed Nov. 14, 1947 5 Sheets-Sheet 5

RECEIVER

TRANSMITTER

INVENTOR
R. E. GRAHAM
BY Hugh S. Wertz
ATTORNEY

Patented Jan. 1, 1952 2,580,673

UNITED STATES PATENT OFFICE 2,580,673

SAW-TOOTH GENERATOR AND SYSTEM UTILIZING IT

Robert E. Graham, New York, N. Y., assignor to Bell Telephone Laboratories, Incorporated, New York, N. Y., a corporation of New York Application November 14, 1947, Serial No. 785,967

7 Claims. (Cl. 250—27)

This invention relates to television and more specifically to electronic television systems wherein the scanning voltages are produced by sine waves.

It is an object of this invention to utilize sine waves in the generation of scanning voltages.

It is another object of this invention to employ sine waves of the synchronization of electronic television systems.

In a copending application of the present inventor, Serial No. 785,966 filed November 14, 1947, it is pointed out that in the majority of present-day electronic television systems the start-stop system of scanning is employed wherein the scanning voltages are produced by saw-tooth oscillators, these oscillators being triggered by steep-sloped synchronizing pulses applied once per cycle of the saw-tooth wave. The synchronizing information in this type of system is transmitted in the form of a complex voltage pattern which requires the full video frequency channel for faithful reproduction. In this copending application, the disadvantages of such a start-stop system of scanning are discussed and various systems of synchronization are disclosed which are free from many of these disadvantages. These systems utilize sine waves for synchronizing purposes, the heart of each of the synchronizing systems comprising the specific means provided for transforming sine waves into saw-tooth waves. The present invention relates to television synchronizing systems employing sine waves and which are alternatives to both the R. M. A. system employing synchronizing pulses and to the other systems employing sine waves disclosed in the copending Graham application. The nucleus of a system in accordance with the invention is a novel converter for transforming sine waves into saw-tooth waves.

In accordance with an illustrative embodiment of the present invention, there is provided a converter for transforming sine waves into saw-tooth waves comprising apparatus for selecting and commutating between quarter wave segments of four sinusoidal waves each 90 degrees displaced from the immediately preceding one. The quarter wave segments in each case are taken between points 45 degrees on either side of the point where the wave crosses the zero axis. Each quarter wave segment produces a complete scan of the beam in a cathode ray tube.

In a modified arrangement, instead of using 90 degrees of each wave for a complete scan, two quarter cycle sections are joined to complete a traversal. In order to accomplish this lapping of two waves, two of the four sine waves are superposed on a different direct current pedestal than are the other two.

In order to produce synchronization between the sending and receiving ends of a television transmission system, two sine waves of the proper frequency are used at the transmitter to produce saw-tooth waves to control the scanning of the electron camera tube beam, one of the two sine waves is modulated by the other, and the modulated wave is injected into an idle frequency region of the video signal and transmitted to the receiving station where it is demodulated and the resulting sine waves utilized to produce saw-tooth waves to control the scanning of the beam of the television receiving tube.

The invention will be more readily understood by referring to the following description taken in connection with the accompanying drawings forming a part thereof in which.

Figure 1:
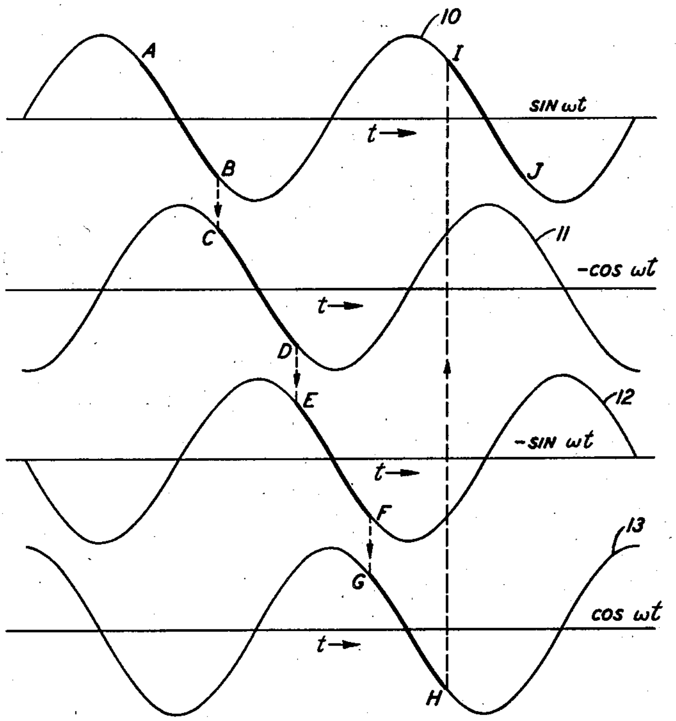
Fig. 1 shows schematically how portions of four sine waves can be combined to produce a saw-tooth wave.
Figure 2:
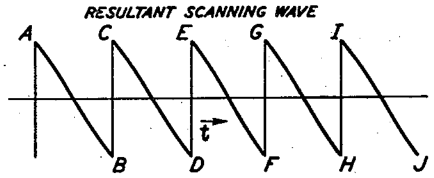
Fig. 2 shows the resultant scanning waves produced by using the method illustrated in Fig. 1.

Referring more specifically to the drawings, Fig. 1 represents graphically how portions of four sine waves can be combined to produce a saw-tooth wave of the type shown in Fig. 2. These four sine waves 10, 11, 12 and 13 all have the same frequency and are displaced 90 degrees apart as shown in Fig. 1. Thus the top wave 10 may be represented by the expression sin $\omega T$, the wave 11 by the expression $-\cos \omega T$, the third wave 12 by the expression $-\sin \omega T$, and the bottom wave 13 by the expression cos $\omega T$. Quarter wave segments from these four waves (such as the segment AB of wave 10, segment CD of wave 11, segment EF of wave 12, segment GH of wave 13, segment IJ of wave 10, etc.) are selected by commutating between them as indicated by the dashed lines and arrows between the waves, and by this means the closely linear saw-tooth wave of Fig. 2 is obtained. The quarter wave segments AB, CD, etc. in each case are taken between points 45 degrees on either side of where the wave crosses the zero axis.

Figure 3:
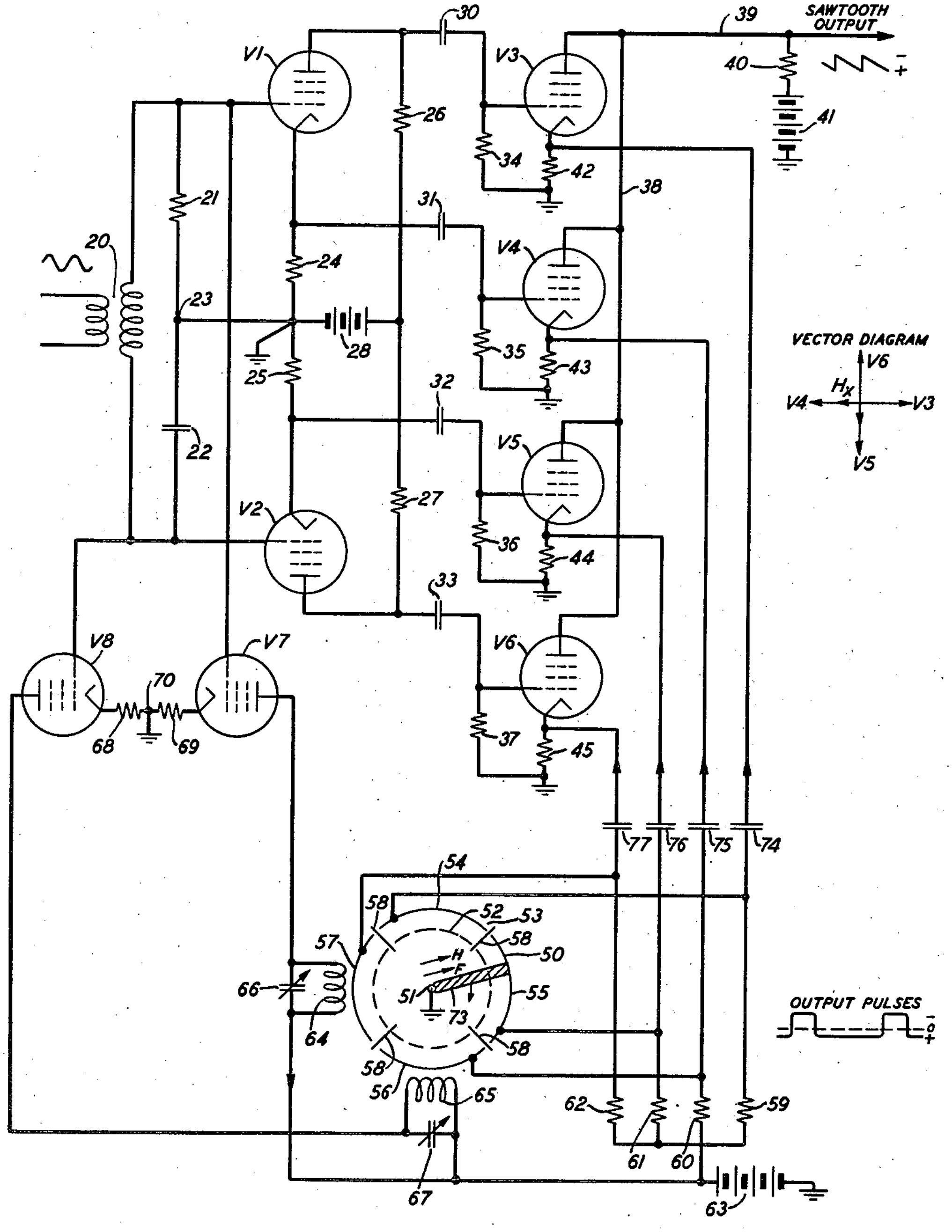
Fig. 3 is a diagram of a circuit making use of the method illustrated in Fig. 1.

Fig. 3 is a schematic diagram of a circuit for performing the functions suggested by the graphical representation of Fig. 1. The circuit arrangement of Fig. 3, by way of example, produces a saw-tooth wave output at 15.75 kilocycles (the line scanning frequency for 525 line television) when driven from a 3.9375-kilocycle sine wave. The 3.9375-kilocycle sine wave is fed into the primary of the transformer 20, the secondary of which terminates in a resistance 21 and condenser 22 in series. The relative magnitudes of the resistance 21 and the condenser 22 are such that two equal voltages 90 degrees displaced in phase are developed between the two ends of the secondary winding of the transformer 20 and the grounded point 23. These two voltages are applied to the grid-cathode circuits of the tubes V1 and V2, respectively. Each of these tubes has a cathode impedance (24 or 25) and a plate load impedance (26 or 27), all of these impedances being equal, so that each tube produces outputs of both polarities of its input wave. A source of B supply 28 is connected between the common terminal of the impedances 26 and 27 and ground.

The four waves produced in the output of the tubes V1 and V2 are applied by means of coupling condensers 30, 31, 32, and 33, respectively, and grid resistors 34, 35, 36, and 37, respectively, to the grid-cathode circuits of the respective tubes V, V4, V5 and V6. The plates of the four tubes V3 to V6, inclusive, are connected by means of a common wire 38 which is in turn connected to the output terminal 39 to give a common output for the four tubes V3 to V6, inclusive. The common plate impedance 40 and source of B supply 41 are connected between the terminal 39 and ground. The tubes V3 to V6, inclusive, have respective cathode resistors 42, 43, 44 and 45 connected between each cathode and ground.

The tubes V3 to V6, inclusive, are switched on and off in succession, in the manner previously indicated in the schematic diagram of Fig. 1, to give an output wave like that shown in Fig. 2. This switching is accomplished by feeding properly shaped pulses from a radial beam commutator tube 50 into the cathode circuit of each of the tubes V3 to V6, inclusive. Tube 50 comprises a straight wire cathode 51 mounted concentrically with surrounding cylindrical electrodes 52 and 53. The tube 50 employs principles which are set forth in Patent 2,217,774, issued October 15, 1940, to A. M. Skellett but the tube structure is specifically different from that disclosed in the Skellett patent. The electrode 52 is a screening grid divided into four segments and the electrode 53 is a signal anode which is likewise divided into four segments 54, 55, 56 and 57, respectively, the segments being separated by appropriate shielding means 58. While, for simplicity in the drawings, the envelope in which the electrode structure of tube 50 is supported has not been shown, it is to be clearly understood that this electrode structure is contained within a properly evacuated envelope. The cathode 51 is grounded while the segments 54, 55, 56 and 57 are connected through respective resistors 59, 61, 60, and 62 to the positive terminal of a source of B supply 63, the other terminal of which is connected to ground. The potential of the source 63 is of the order of 150 volts. The electrode assembly just described is immersed in a uniform magnetic field perpendicular to the axis of the cylinder which is produced, for example, by magnet coils 64 and 65 arranged to produce uniform orthogonal fields perpendicular to the cylindrical axis in a manner which will be described below. Variable condensers 66 and 67 are connected across the respective coils 64 and 65 for phasing purposes. By means of two sine waves respectively applied between diametrically opposite ones of the four sections into which the screening electrode 52 is connected, a rotating electric field is produced which has the function of suppressing one side of the radial sheet 73 of electrons. For simplicity in the drawings, the connections to the four segments of the electrode 52 have not been shown but they are similar to those shown in the radial beam tube of this general type disclosed in Fig. 5 of the above-identified copending Graham application.

The two orthogonal sinusoidal voltages for feeding the coils 64 and 65 are produced by connecting the grids of the tubes V1 and V2 respectively, to the grids of tubes V7 and V8 which amplify the voltages at the input of the tubes V1 and V2 and apply them to the coils 64 and 65 which are connected in their output circuits. The source 63 is used to provide B-voltage for these tubes. The cathodes are connected by resistors 68 and 69, the common terminal 70 of which is connected to ground.

The operation of the circuit shown in Fig. 3 will now be described. Electrons are emitted from the cathode 51 and accelerated radially by the positive electric field set up by the surrounding electrode 53. The action of the magnetic field produced by the coils 64 and 65 in cooperation with the electrostatic rotating field applied to the screening electrode 52 is to concentrate the electrons from the cathode into a thin radial sheet 73 which lies parallel to the magnetic and electric fields as shown in Fig. 3. The rotation of the magnetic and electric fields causes the thin sheet 73 to revolve. On reaching a given quadrant of the anode 53, the electron sheet 73 produces a drop in voltage across the connected load 59, 60, 61 or 62. This drop is held constant for the following quarter cycle until the sheet leaves the anode section and proceeds to the next. Thus at each anode section there is produced a pulse of 3 to 1 symmetry. Upon passing through a coupling condenser (74, 75, 76 or 77) to the cathode of one of the four output tubes (V3, V4, V5 or V6), this voltage variation becomes a positive pulse for three-fourths of the cycle and a negative pulse for the remainder, as indicated in the lower right-hand corner of the circuit diagram of Fig. 3. The positive interval pulse of each biases the associated tube to cutoff and nullifies its signal transmission. The quarter cycle negative interval of the pulse swings the associated tube to a normal operating bias and permits it to transmit its sine wave grid signal. Thus the four tubes V3, V5, V4 and V6 are turned on in succession, producing the desired commutating action. The relation of the output voltages of the tubes V3, V4, V5 and V6 is shown in the vector diagram at the right of Fig. 3. The saw-tooth output is shown at the top of the circuit diagram.

The output saw-tooth wave can be shifted in time by shifting the phase of the 3.9375-kilocycle sine wave input. The polarity of the saw-tooth wave can be reversed by reversing the connection to each of the two magnet coils 64 and 65.

It should be noted that the arrangement is not critical as to possible irregularities which may take place in commutating time, such as a momentary simultaneous output from two tubes due to overlapping of the commutator beam. The reason for this is that the transition periods occur during the signal blanking times. Similarly, it can be stated that the switching pulse edges need not be particularly sharp; in fact, considerably less so than those in the R. M. A. system.

At this point it appears desirable to compare the arrangement of Fig. 3 with the conventional television system employing synchronizing pulses for triggering the saw-tooth waves. It might be wondered just what advantage the present system has over the conventional start-stop system since it is apparent that some sort of timing must be employed in switching between the various waves 10, 11, 12 and 13 of Fig. 1. However, inspection reveals that the only effect of vacillations in the commutating times is to produce irregularities at the extreme edges of the picture, the synchronism over the body of the picture remaining entirely intact. The reason for this can be illustrated as follows: Suppose that a scan employing wave 10 continues past the proper switching time, that is past the point B. Meanwhile the wave 11 progresses just as though it were controlling the scan, so that when the switching does take place, the wave 11 has the proper amplitude corresponding to the new time of switching. This results in a slight extension in the line AB at the end of the scan and a slight omission in the line CD at the beginning of the next scan, the remaining portions of both lines maintaining the proper position versus time relation. This contrasts with the start-stop system wherein the scanning oscillation for a given scan cannot commence until after the previous line is terminated. Thus in the R. M. A. start-stop system an extra long duration of the preceding scan causes a bodily shift of the following scan. The same kind of argument applies in the case of an extra short duration scan, of course.

Since the only effect of errors in commutating is to produce border fringes, the commutating time tolerances can be made quite large, the resulting fringes being eradicated by electrically or optically masking the received picture. For instance, if two per cent or three per cent of the picture dimensions are masked off, the commutating pulse time tolerance is from 35 to 50 times that for the synchronizing pulses in the conventional R. M. A. system. This large timing tolerance is about equivalent to that permissible in a 60-line television system.

The advantages of the system disclosed in the copending Graham application, that is, that disturbances in the synchronizing wave cause only local line disturbances rather than whole frame or whole line shifts, also applies in the present case. As pointed out in the copending application and applicable as well in the present case, the saw-tooth wave is obtained from the sinusoidal wave in such a way that the timing of the saw-tooth as a whole depends not upon the instantaneous value of the sine wave at some chosen point during the cycle, but rather upon the average integrity of the sinusoidal shape over a full cycle. The importance of this is illustrated by the fact that an undesired irregularity in the source wave occurring for only a fraction of a cycle produces a corresponding sweep error only for the duration of the irregularity, the remaining portions of the cycle being unaffected. This is in sharp contrast to synchronization failures encountered with the triggering type of sweep mechanism where entire lines or fields are displaced. The importance of this difference is more clearly brought out by the fact that disturbances in synchronism are most visible to the eye when they occur in regions of high detail. For instance, jagged horizontal and vertical lines or borders are probably the worst offenders, for comparatively large synchronizing errors can go unnoticed in areas of uniform shading or slow gradation in tone. The sinusoidally-controlled system takes a statistical advantage of this difference since synchronizing disturbances exhibit their effects only for the portions of the picture at which they occur. The novelty of the sinusoidally-controlled system might be further restated as a point-for-point correlation between the sine wave and the saw-tooth wave; as against a single point—complete cycle correlation between the synchronizing wave and saw-tooth wave in the present R. M. A. system.

In addition, since the source wave is a sinusoid, it can be transmitted over a channel having a very low signal-to-noise ratio and still be recovered with good fidelity through the use of sharply resonant filters. Also the synchronizing wave can be quite effectively freed from noise by using it to control a local receiver oscillator having good frequency stability as disclosed in several arrangements in the copending Graham application.

There are several other ways in which the desired functions can be carried out, particularly the commutating function. Any manner in which the four staggered pulses of the indicated symmetry can be produced will suffice. For instance, four multivibrators driven from four proper phases of the 3.9375-kilocycle sine wave (such as that applied to transformer 20 in Fig. 3) can be used; also these pulses can be obtained by amplitude limiting two 90-degree displaced 3.9375-kilocycle sine waves and then mixing the resultants in various ways.

Figures 4, 5, 7:
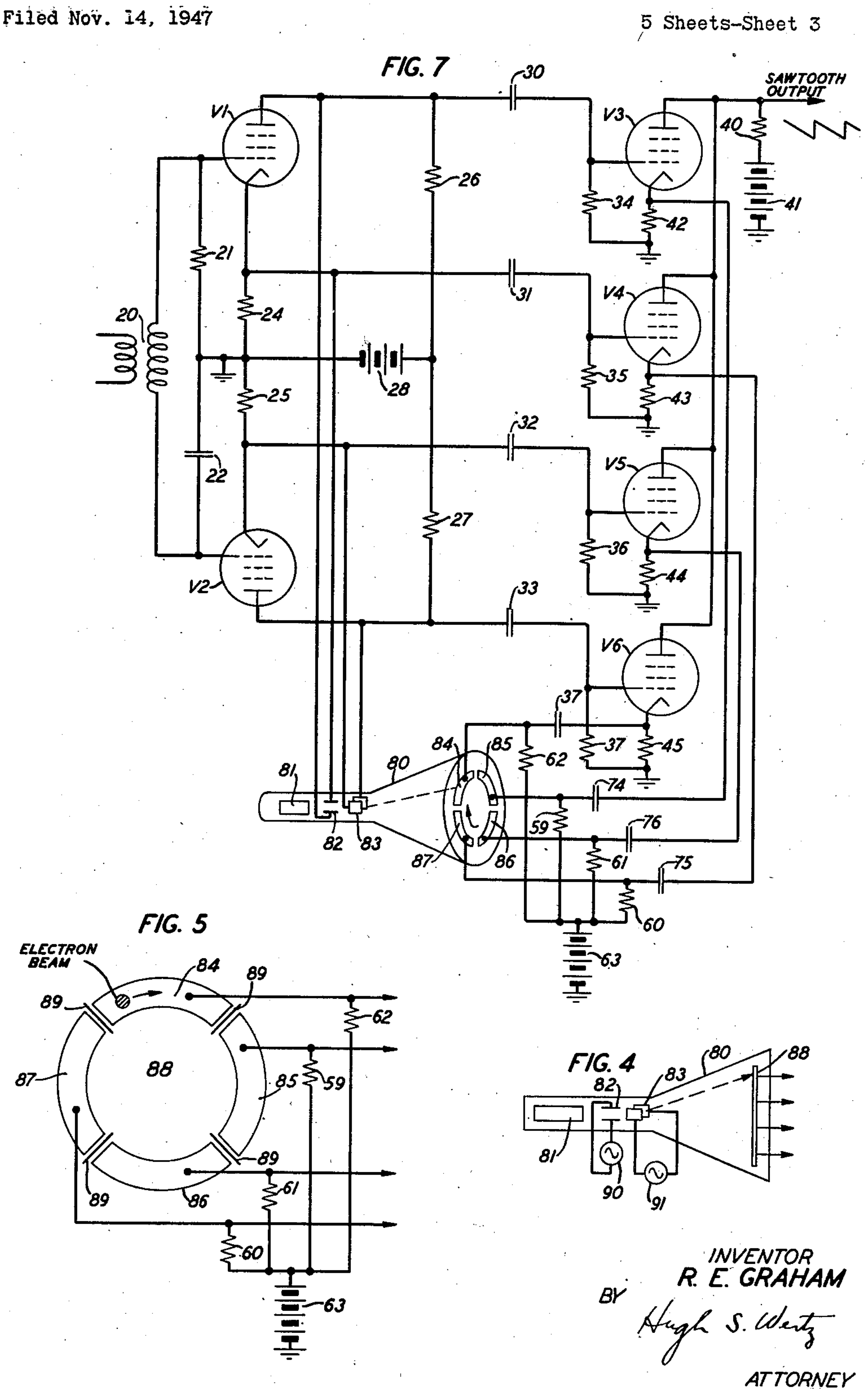
Fig. 4 shows a commutator tube employed in the formation of saw-tooth waves from sine waves.
Fig. 5 shows the four commutator segments of the tube of Fig. 4 and external circuit connections therefor.
Fig. 7 shows a circuit diagram making use of the method of Fig. 6 to produce saw-tooth waves from sine waves.

Still another alternative arrangement is that shown in Fig. 4. It consists of an ordinary cathode ray tube 80 arranged to perform the same function as the radial beam tube 50 of Fig. 3. A focussed beam of electrons is produced in the electron gun 81 and deflected in two directions at right angles to each other by proper waves from the sources 90 and 91 applied to the pairs of deflecting plates 82 and 83, respectively. When the waves of the sources 90 and 91 are sine waves having a 90° phase relationship and of the proper intensity, this deflection causes the beam to move in a path over the circular array of four electrodes 84, 85, 86 and 87 (shown in Fig. 5) which make up the target structure 88 of the tube of Fig. 4. By utilizing the current variation at these four electrodes 84 to 87, inclusive, the same kind of output pulses as those produced by the radial beam tube 50 in Fig. 3 is obtained. These four electrodes can be connected into the circuit of Fig. 3 in the same manner as the quadrantal anodes 54, 55, 56 and 57 of the tube 50. A fairly large beam current can be used since the beam diameter can be as large as approximately one-fortieth of the circle periphery. Thus for the 3-inch diameter tube the beam can be about one-fourth inch in diameter. The electrodes 84 to 87, inclusive, can be made in the form of cups and interelectrode shields 89 used to confine secondary emission.

In the scanning wave produced by the circuit of Fig. 3, the maximum deviation from the mean slope is about 20 per cent, occurring at the scanned extremities. However, it should be emphasized that this deviation does not result in non-linearity, since the same type of scanning wave is used at both transmitter and receiver. Actually this magnitude of slope deviation probably passes unnoticed in many present systems where it does act to produce non-linearity. It is true that the velocity variations of the sinusoidal system will produce a slight brightness modulation at the reproducer cathode ray tube but this will either be negligible or easily compensated for.

The theory involved in this method of sweep production can be carried still further by commutating between a greater number of sine waves. In general, N sinusoids separated by $$\frac{360}{N}$$

degrees can be used. The maximum percentage slope deviation may be found from the expression $$100\left(1-\frac{\pi}{N}\cot\frac{\pi}{N}\right)$$

Figure 6:
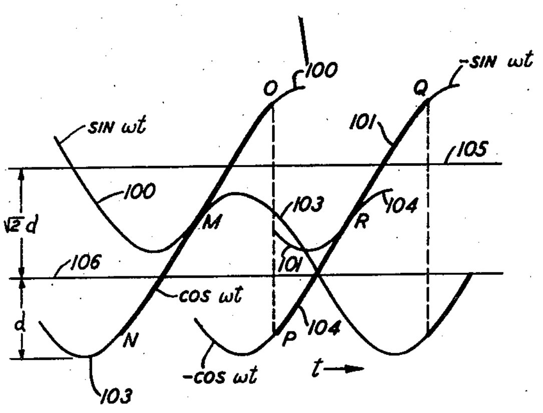
Fig. 6 represents graphically another way of combining four sine waves to form a saw-tooth wave.

A slightly different way of combining four sine waves to form a saw-tooth wave is illustrated in Fig. 6. Here, instead of using 90 degrees of each wave for a complete scan, two quarter cycle sections are joined to complete a traversal. In order to accomplish this lapping of two waves, two of the four, that is, sine waves 100 and 101, are superposed on a different bias current pedestal 105 than the other two (waves 103 and 104) which have the bias current 106. As indicated in Fig. 6, the direct current bias current bias current 105 is greater than that of 106 by a factor of $\sqrt{2}$ times the peak value of the sine wave. A disadvantage of the method suggested by Fig. 6 is that one of the switching operations must take place in the middle of the scan (at point M in the scan NO, at the point R in the scan PQ, etc.). This trouble can be alleviated by arranging so that the decay of the wave being switched off is cancelled by the rise of the one being switched on. If this is done, then the time of switching can be made moderately large. Also it can be stated that sizable time vacillations of the switching occurring in the middle of the scan cause no appreciable effect. This is true because the portion of the wave which is being utilized just before the switching occurs is not very different from the immediately following portion of the wave to be switched to.

A schematic circuit diagram of a suitable circuit for carrying out the method illustrated in Fig. 6 is shown in Fig. 7. The arrangements of the tubes V1 to V6, inclusive, are quite similar and operate in substantially the same way as the correspondingly identified tubes in the arrangement of Fig. 3. Also other circuit elements which are similar to those in Fig. 3 have been given the same reference characters as the corresponding elements in Fig. 3. The only differences are that a 7.875-kilocycle input is used to obtain a 15.75-kilocycle output and that the steady components of the plate currents of the tubes V3 and V4 when turned on are different from those of V5 and V6. This difference in operating current is obtained by making resistors 61 and 62 larger than resistors 59 and 60. For variety, the commutator described with reference to Figs. 4 and 5 has been used instead of the radial beam tube 50 in the arrangement of Fig. 3. It is interesting to note that by providing a simple switch to make resistors 61, 62 equal to resistors 59, 60, and thus alter the operating current of V3 and V4 to a value equal to that of V5 and V6, a doubling of the saw-tooth frequency can be obtained, giving a 31.5-kilocycle scan in this case.

Either of the arrangements shown in Fig. 3 and Fig. 7 can be used to generate triangular rather than saw-tooth waves by simply employing sine waves of opposite slope in adjacent commutating periods.

Having considered various saw-tooth wave derivation means, two arrangements of complete systems employing these means will now be considered. The first of these systems is shown in Figs. 8 and 9, Fig. 8 being a block diagram of a portion of the apparatus at a television transmitting station and Fig. 9 being a block diagram of a portion of the equipment at the receiver station.

Figure 9:
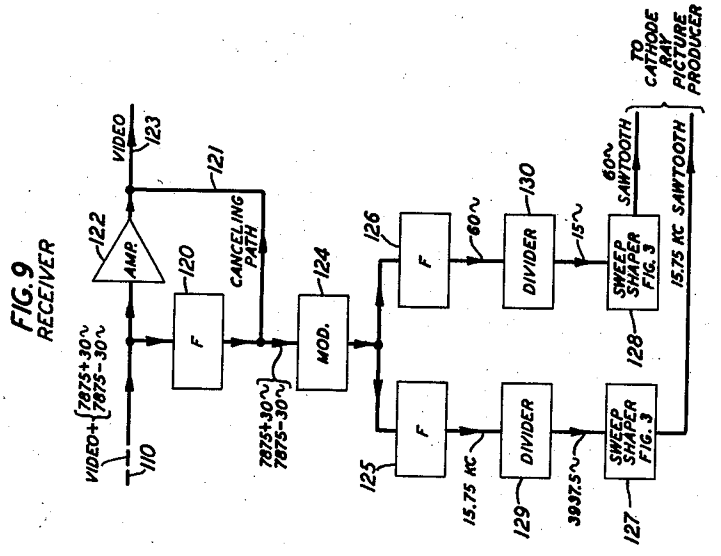
Fig. 9 is a block diagram of a portion of the apparatus at the receiving station of the system whose transmitting end is shown in Fig. 8.
Figure 8:
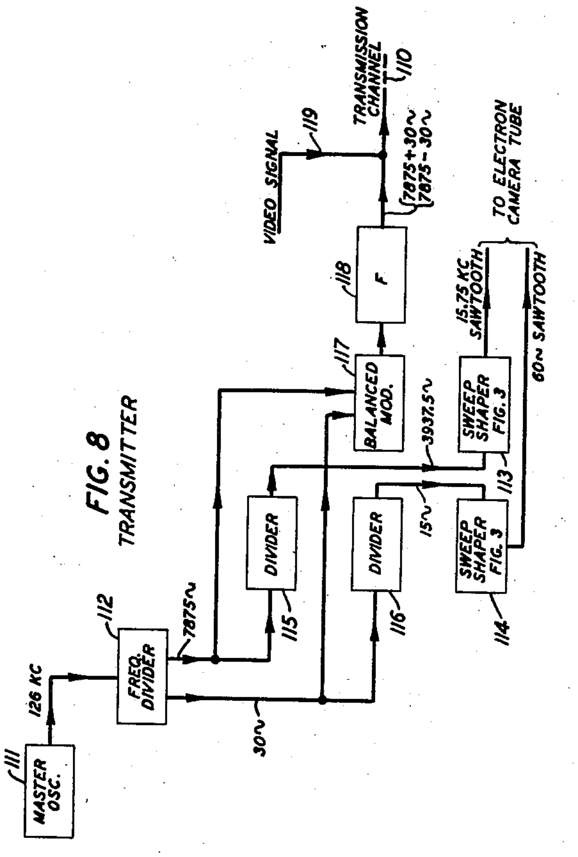
Fig. 8 is a block diagram of a portion of the apparatus at a transmitting station of a television system employing sine waves for synchronization.

In the system shown in Figs. 8 and 9, 7875+30 cycle and 7875−30 cycle sine waves are sent over the transmission channel 110. In this system the synchronizing signals (the two sine waves) are inserted into an idle region of the picture frequency spectrum (that around ½ line frequency). To ensure that this region is truly idle, a narrow rejection filter (not shown), tuned to 7875 cycles, may be inserted in the video path before combining with the sine wave signals. A multiple of the line frequency (such as 126 kilocycles, for example) is supplied by a suitable master oscillator 111. Frequency division by means of a suitable frequency divider 112 is used to derive 7875 cycles and 30 cycles sine waves. These frequencies are further divided by dividers 115 and 116 to obtain 3937.5 cycles and 15 cycles. These new frequencies are fed to local sweep converters or sweep shapers 113 and 114 which are similar to the arrangement shown in Fig. 3. The outputs of the sweep shapers are the transmitter sweeps to drive the beam in the electron camera tube of the transmitting station. The 30 cycle and 7875 cycle sine waves also are mixed in a balanced modulator 117. By filtering the output of the member 117 and the filter 118, the sum and difference of the half line and half field frequencies are obtained, or in other words, 7875 plus 30 cycles and 7875 minus 30 cycles. These two are located at very nearly half line frequency which is an idle frequency region in the television spectrum. Accordingly, these frequencies are linearly mixed into the video signal which is applied by means of the connection 119 and the mixed waves are applied to the transmission channel 110.

At the receiving station shown in Fig. 9, the synchronizing frequencies are separated out by a narrow filter 120. By proper reintroduction of these separated frequencies into the composite signal by means of the cancelling path 121 connected to the output of the amplifier 122, to the input of which is applied the video signals and also the synchronizing sine waves, the video signals alone are isolated at the terminals 123. The two synchronizing frequencies are mixed in a modulator 124 the output of which is applied to the filters 125 and 126 which are tuned to yield 15.75 kilocycles and 60 cycles. These are divided by dividers 129 and 130 to yield 3937.5 cycles and 15 cycles respectively, which are applied to sweep shapers 127 and 128 which are similar to the shapers 113 and 114 of the transmitting station.

Figure 11:
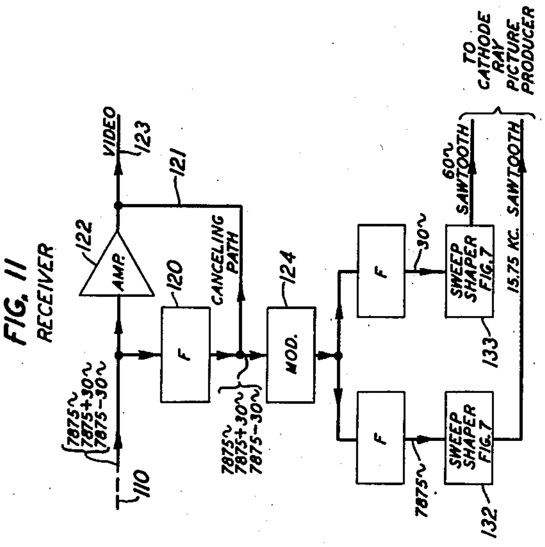
Figs. 10 and 11 are block diagrams of portions of the apparatus at the transmitting and receiving ends, respectively, of another television system which obtains synchronization by means of sine waves.
Figure 10:
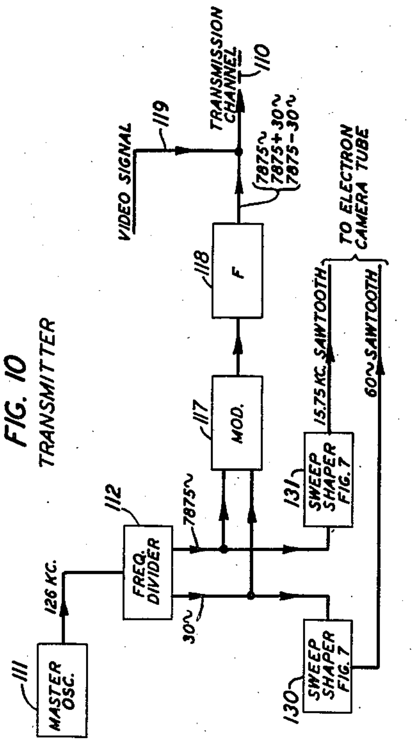

The arrangement of Figs. 8 and 9 can be slightly simplified by making use of the type of sweep converter of Fig. 7. Since these converters produce 15.75-kilocycle and 60-cycle sweeps from a 7875 cycle input, the frequency halving operation used by the dividers 115 and 116 in Fig. 8 can be eliminated. This is shown in the system of Figs. 10 and 11 wherein Fig. 10 shows a transmitting station similar to that of Fig. 8 except that the dividers 115 and 116 are eliminated. By frequency dividing from the master oscillator frequency, 7875 cycle and 30-cycle frequencies are obtained at the output of the frequency divider 112. These frequencies are applied directly to sweep shapers 130 and 131, the outputs of which are connected to the electron camera tube to produce the sweeping of the beam in that tube. In addition, the 30-cycle and the 7875-cycle waves are mixed in the modulator 117 the output of which is filtered by filter 118 and yields 7875 and 7875 ±30 cycles per second. This combination is linearly mixed into the video signal and transmitted over the channel 110 to the receiving station shown in Fig. 11. At the receiver, the synchronization and video signals are separated as in Fig. 9. The three synchronizing frequencies are then fed to the linear demodulator 124 which yields the required 7875-cycle and 30-cycle per second sine waves which are applied to the sweep shapers 132 and 133, respectively, similar to the shapers 130 and 131 at the receiving stations. The outputs of the shapers 132 and 133 are applied to the cathode ray picture reproducer tube to control the scanning of the beam therein in synchronism with the scanning of the electron camera tube at the receiving station.

While various specific examples of frequencies have been given above and have been indicated on the drawings, it will be apparent that these are merely by way of example and other values of frequencies can be used instead. Various other changes can be made in the embodiment described above without departing from the spirit of the invention the scope of which is indicated in the appended claims.

What is claimed is:

1. Means for producing saw-tooth waves from sine waves comprising means for producing four sine waves of the same frequency each displaced in phase 90 degrees from the immediately preceding one, means for commutating between similar quarter wave sections of each cycle of each of the four waves, each of the quarter wave sections being taken from a point 45 degrees before the wave from which the section is taken crosses its axis of symmetry to a point 45 degrees after the said wave crosses this axis, and means for applying said commutated quarter-wave sections to a single saw-tooth wave utilization device.

2. Means for producing saw-tooth waves from sine waves comprising means for producing four sine waves of the same frequency each displaced in phase 90 degrees from the immediately preceding one, and means for commutating between similar quarter wave sections of each cycle of each of the four waves, each of the quarter wave sections being taken from a point 45 degrees before the wave from which the section is taken crosses its axis of symmetry to a point 45 degrees after the said wave crosses this axis, said commutating means comprising a radial beam tube comprising a cathode and an anode arrangement mounted coaxially with the cathode, said anode arrangement being divided into four quadrantal sections, and means for rotating the beam produced between said cathode and anode over said quadrantal sections in turn.

3. Means for producing saw-tooth waves from sine waves comprising means for producing four sine waves of the same frequency each displaced in phase 90 degrees from the immediately preceding one, and means for commutating between similar quarter wave sections of each cycle of each of the four waves, each of the quarter wave sections being taken from a point 45 degrees before the wave from which the section is taken crosses its axis of symmetry to a point 45 degrees after the said wave crosses this axis, said commutating means comprising a radial beam tube comprising a cathode and an anode arrangement mounted coaxially with the cathode, said anode arrangement being divided into four quadrantal sections, and means for rotating the beam produced between said cathode and anode over said quadrantal sections in turn, four electron discharge devices to the input circuits of which are applied respectively said four sine waves, means for connecting to said input circuits to cut off said tube periodically the outputs of said respective quadrantal sections of the radial beam tube, a common output circuit for said four discharge devices, and means for applying the outputs of said four discharge devices to said common output circuit to produce a saw-tooth wave therein.

4. Means for producing saw-tooth waves from sine waves comprising means for producing four sine waves of the same frequency each displaced in phase 90 degrees from the immediately preceding one, and means for commutating between similar quarter wave sections of each cycle of each of the four waves, each of the quarter wave sections being taken from a point 45 degrees before the wave from which the section is taken crosses its axis of symmetry to a point 45 degrees after the said wave crosses this axis, said commutating means comprising a cathode ray tube having means for generating a beam of electrons, two sets of deflecting plates for causing deflection of said beam in directions at right angles to one another, means for applying proper deflecting waves to said sets of plates to cause said beam to go in a circle, and a target structure comprising four segments positioned so that they are successively in the path of said beam as it traverses said circle.

5. Means for producing saw-tooth waves from sine waves comprising means for producing four sine waves of the same frequency each displaced in phase 90 degrees from the immediately preceding one, and means for commutating between similar quarter wave sections of each cycle of each of the four waves, each of the quarter wave sections being taken from a point 45 degrees before the wave from which the section is taken crosses its axis of symmetry to a point 45 degrees after the said waves crosses this axis, said commutating means comprising a cathode ray tube having means for generating a beam of electrons, two sets of deflecting plates for causing deflection of said beam in directions at right angles to one another, means for applying proper deflecting waves to said sets of plates to cause said beam to go in a circle, a target structure comprising four segments positioned so that they are successively in the path of said beam as it traverses said circle, four electron discharge devices to the input circuits of which are applied respectively said four sine waves, means for connecting to said input circuits to cut off said tube periodically the outputs of said respective segments of the cathode ray tube, a common output circuit for said four discharge devices, and means for applying the outputs of said four discharge devices to said common output circuit to produce a saw-tooth wave therein.

6. Means for producing saw-tooth waves from sine waves comprising means for producing four sine waves of the same frequency each displaced in phase 90 degrees from the immediately preceding one, means for commutating between quarter wave sections of each cycle of each of the four waves, each of the quarter wave sections being taken between two points on each wave, one of which is positioned on said wave 45 degrees before the point at which said wave crosses the alternating current axis and the other one of said two points is positioned on said wave 45 degrees after the wave crosses this axis, and means for applying said commutated quarter-wave sections to a single saw-tooth wave utilization device.

7. Means for producing saw-tooth waves from sine waves comprising means for producing four sine waves of the same frequency and peak value each displaced in phase 90 degrees from the immediately preceding one and each having a direct current bias component, the direct current bias component of the first and third of said waves being greater than that of the second and fourth by a factor of $\sqrt{2}$ times the peak value of the sine wave, means for commutating between similar quarter wave sections of each cycle of each of the four waves, each of the quarter wave sections being taken from a point 45 degrees before the wave from which the section is taken crosses its axis of symmetry to a point 45 degrees after the said wave crosses this axis and means for applying said commutated quarter-wave sections to a single saw-tooth wave utilization device.

ROBERT E. GRAHAM.

REFERENCES CITED

The following references are of record in the file of this patent:

UNITED STATES PATENTS

| Number | Name | Date |
|---|---|---|
| 1,928,093 | Coyle | Sept. 26, 1933 |
| 2,189,898 | Hartley | Feb. 13, 1940 |
| 2,217,774 | Skellett | Oct. 15, 1940 |
| 2,226,459 | Bingley | Dec. 24, 1940 |
| 2,231,971 | Tubbs | Feb. 18, 1941 |
| 2,310,197 | Hansell | Feb. 2, 1943 |
| 2,391,967 | Hecht | Jan. 1, 1946 |